United States Patent
Cooper et al.

(10) Patent No.: US 9,916,370 B1
(45) Date of Patent: Mar. 13, 2018

(54) SYSTEMS FOR CROWD TYPING BY HIERARCHY OF INFLUENCE

(71) Applicant: BehaviorMatrix, LLC, Blue Bell, PA (US)

(72) Inventors: Joshua N. Cooper, Columbia, SC (US); Keith A. Harry, North Wales, PA (US)

(73) Assignee: Element Data, Inc., Seattle, WA (US)

( * ) Notice: Subject to any disclaimer, the term of this patent is extended or adjusted under 35 U.S.C. 154(b) by 247 days.

(21) Appl. No.: 14/604,163

(22) Filed: Jan. 23, 2015

Related U.S. Application Data

(60) Provisional application No. 61/930,509, filed on Jan. 23, 2014.

(51) Int. Cl.
*G06F 17/30* (2006.01)
*G06Q 30/02* (2012.01)

(52) U.S. Cl.
CPC .. *G06F 17/30572* (2013.01); *G06F 17/30876* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 7,933,843 B1 | 4/2011 | von Groll | |
| 8,132,114 B2 * | 3/2012 | Grechanik | G06F 8/38 702/20 |
| 8,543,533 B2 | 9/2013 | Lozano | |
| 8,682,723 B2 | 3/2014 | Parsons | |
| 8,914,500 B1 * | 12/2014 | Liu | G06Q 30/0269 709/223 |
| 9,317,559 B1 * | 4/2016 | Blair-Goldensohn | G06F 17/3053 |
| 2003/0101449 A1 | 5/2003 | Bentolila et al. | |
| 2005/0049908 A2 | 3/2005 | Hawks | |
| 2009/0006469 A1 * | 1/2009 | Jain | G06Q 30/02 |
| 2011/0055132 A1 | 3/2011 | Mahdian | |
| 2011/0313987 A1 * | 12/2011 | Ghosh | G06F 17/30675 707/706 |
| 2012/0117059 A1 | 5/2012 | Bailey | |
| 2012/0290370 A1 * | 11/2012 | Montero | G06Q 30/0203 705/14.4 |
| 2013/0159054 A1 * | 6/2013 | Evans | G06Q 30/0202 705/7.31 |
| 2013/0173333 A1 * | 7/2013 | Zhang | G06Q 50/01 705/7.29 |
| 2013/0262320 A1 * | 10/2013 | Makanawala | H04L 51/32 705/304 |

(Continued)

OTHER PUBLICATIONS

Hui, Peter, Quantifying Sentiment and Influence in Blogspaces, 1st Workshop on Social Media Analytics (Soma '10), Jul. 25 2010, Washington, DC.

*Primary Examiner* — Hung Le
(74) *Attorney, Agent, or Firm* — Dunlap Codding, P.C.

(57) ABSTRACT

Systems and methods for providing hierarchy scores are described. Generally, influence scores for authors of a crowd may be determined based on emotional scores and echoing of time series data strings. One or more regression lines may be determined based on the influence scores to provide a raw hierarchy score and/or a central hierarchy score. Analysis and/or comparisons of the hierarchy scores may be used to classify the crowd type and output an influential score report.

17 Claims, 7 Drawing Sheets

(56) References Cited

U.S. PATENT DOCUMENTS

| | | | |
|---|---|---|---|
| 2013/0279672 A1* | 10/2013 | Mohan | G06Q 10/0635 |
| | | | 379/133 |
| 2013/0325681 A1* | 12/2013 | Somashekar | G06Q 40/00 |
| | | | 705/35 |
| 2014/0079297 A1 | 3/2014 | Tadayon et al. | |
| 2014/0195518 A1* | 7/2014 | Kelsey | G06F 17/30539 |
| | | | 707/722 |
| 2014/0358771 A1* | 12/2014 | Ali | G06Q 20/22 |
| | | | 705/39 |
| 2015/0142580 A1* | 5/2015 | Aydin | G06Q 30/0269 |
| | | | 705/14.66 |
| 2015/0371241 A1* | 12/2015 | Ioannidis | G06Q 10/10 |
| | | | 705/7.29 |

* cited by examiner

Score Report:
Company: XYZ
Product: A
Commissioned: December 5, 2014

| Influencer | Source | Score |
|---|---|---|
| axt2015 | Twitter | 9.99 |
| Hershey12 | Twitter | 9.98 |
| Over_the_Hill | Facebook | 9.98 |
| .... | | |
| .... | | |
| Bobby Bones Show | Radio | 0.32 |
| NYC Fox News | Television | 0.29 |
| Guitar_Hero_Rockstar | Twitter | 0.25 |

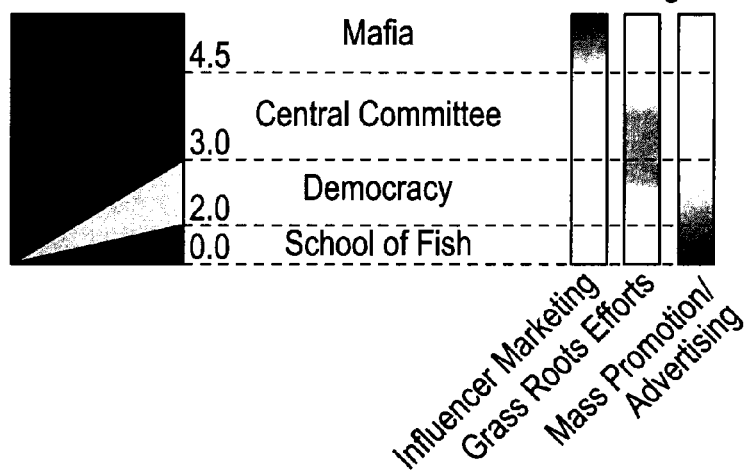

Top Three Influencers of Product:
- Axt2015
- Hershey12
- Over_the_Hill

Crowd Type: Mafia

Marketing Recommendation:
  Marketing approach recommendation is to use Influence Marketing techniques targeting key influencers within the community to enable marketing of Product A.

FIG. 7

SYSTEMS FOR CROWD TYPING BY HIERARCHY OF INFLUENCE

CROSS REFERENCE TO RELATED APPLICATIONS

The present patent application incorporates by reference the entire provisional patent application identified by U.S. Ser. No. 61/930,509, filed on Jan. 23, 2014, and claims priority thereto under 35 U.S.C. 119(e).

BACKGROUND

The field of Behavioral Analytics, or Computational Sentiment Analysis, is concerned with deriving emotional content from often large corpora of textual documents. Such emotional content may be used to guide decision-making. For example, businesses may use such information in marketing expenditures, addressing widely held perceptions of products, services, and/or brands. In another example, governments may use such information to make foreign policy decisions geared towards winning political influence, fine-tune messages, and/or engage new voters whose concerns otherwise might not have been known.

Crowd typing may be beneficial to spread the word about products, political candidates, or even civic ideals. For example, marketers may use the type of crowd to streamline their message regarding a particular product, or determine the best avenues for providing their message to a mass audience. It is anticipated that there may be structural similarities across a community (e.g., political, cultural, consumer, social-web) such that similar strategies may be used for motivating changes in the mindset/behavior among their members. For example, if a community takes its direction from a very small group of individuals, one way to effect change may be to directly persuade those who are considered to be the leaders. If a tightly nested family of committees dominates, then targeting messaging to the most powerful committees may be a cost-effective means to influencing wide-spread opinions of the group. If the crowd is formed of free-thinking, independent types, then broad-scale advertising efforts designed to reach the most individuals may be the most efficient expenditure of a marketing budget. Determination of the crowd type, however, may drive the associative decisions above and techniques are needed to accurately determine the crowd type from often large corpora of textual documents, such as multiple series of social media posts and blog posts.

BRIEF DESCRIPTION OF THE SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

FIG. 7 is an exemplary influential report in accordance with the present disclosure.

DETAILED DESCRIPTION

Figure 1:
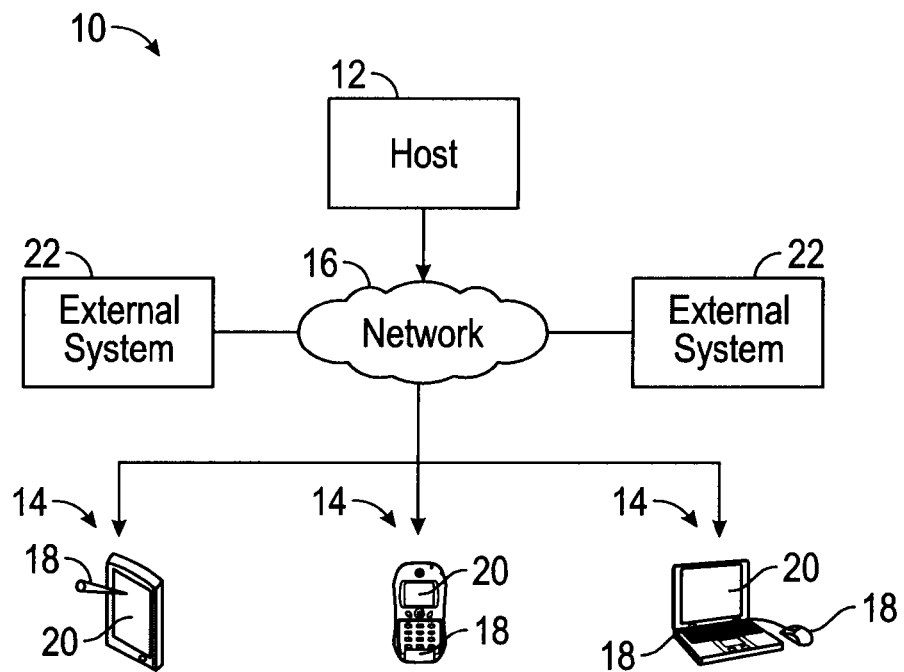
FIG. 1 is a diagrammatic view of an exemplary influential scoring system in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The systems and methods as described in the present disclosure are capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein may be stored on one or more non-transient memory. Exemplary non-transient memory may include random access memory, read only memory, flash memory, and/or the like. Such non-transient memory may be electrically based, optically based, and/or the like.

Referring now to the Figures, and in particular to FIG. 1, shown therein is a schematic diagram of hardware forming an exemplary embodiment of a crowd typing system 10 constructed in accordance with the present disclosure. The crowd typing system 10 may be a system or systems that are able to embody and/or execute the logic of the processes described herein. Logic embodied in the form of software instructions and/or firmware may be executed on any appropriate hardware. For example, logic embodied in the form of software instructions and/or firmware may be executed on dedicated system or systems, on a personal computer system, on a distributed processing computer system, and/or the like. In some embodiments, logic may be implemented in a stand-alone environment operating on a single computer system and/or logic may be implemented in a networked environment such as a distributed system using multiple computers and/or processors.

In some embodiments, the crowd typing system 10 may be distributed, and include one or more host systems 12 (hereinafter referred to as 'the host system 12') communicating with one or more user devices 14 via a network 16. As used herein, the terms "network-based," "cloud-based," and any variations thereof, are intended to include the provision of configurable computational resources on demand via interfacing with a computer and/or computer network, with software and/or data at least partially located on the computer and/or computer network.

The crowd typing system 10 may include the one or more host systems 12. The host system 12 may include a single processor or multiple processors working together or independently to perform a task. In some embodiments, the host system 12 may be partially or completely network-based or cloud based. The host system 12 may or may not be located in single physical location. Additionally, multiple host systems 12 may or may not necessarily be located in a single physical location.

In some embodiments, the network 16 may be the Internet and/or other network. For example, if the network 16 is the Internet, a primary user interface of the crowd typing system 10 may be delivered through a series of web pages on private internal web pages of a company or corporation, which may be written in hypertext markup language or a comparable markup language. It should be noted that the primary user interface of the crowd typing system 10 may be another type of interface including, but not limited to, a Windows-based application, and/or the like.

The network 16 may be almost any type of network. For example, in some embodiments, the network 16 may be an Internet and/or Internet 2 network (e.g., exist in a TCP/IP-based network). It is conceivable that in the near future, embodiments within the present disclosure may use more advanced networking technologies.

As shown in FIG. 1, the one or more user device 14 may include, but are not limited to implementation as a personal computer, a cellular telephone, a smart phone, network-capable television set, a tablet, a laptop computer, a desktop computer, a network-capable handheld device, a server, a digital video recorder, a wearable network-capable device, and/or the like.

In some embodiments, the user device 14 may include one or more input device 18, one or more output device 20, one or more processor (not shown) capable of interfacing with the network 16, processor executable code including a web browser capable of accessing a website and/or communicating information and/or data over a network (e.g., network 16), and/or the like. As will be understood by persons of ordinary skill in the art, the user devices 14 may include one or more non-transient memory comprising processor executable code and/or software application(s), for example. Embodiments of the crowd typing system 10 may also be modified to use any user device 14 or future developed devices capable of communicating with the host system 12 via the network 16.

The one or more input device 18 may be capable of receiving information input from a user and/or processor(s), and transmitting such information to other components of the user device 14 and/or the network 16. The one or more input device 18 may include, but are not limited to, implementation as a keyboard, touchscreen, mouse, trackball, microphone, fingerprint reader, infrared port, slide-out keyboard, flip-out keyboard, cell phone, PDA, remote control, fax machine, wearable communication device, network interface, combinations thereof, and/or the like, for example.

The one or more output device 20 may be capable of outputting information in a form perceivable by a user and/or processor(s). For example, the output device 20 may include, but is not limited to, implementations as a computer monitor, a screen, a touchscreen, a speaker, a website, a television set, a smart phone, a PDA, a cell phone, a fax machine, a printer, a laptop computer, combinations thereof, and the like, for example. It is to be understood that in some exemplary embodiments, the input device 18 and the output device 20 may be implemented as a single device, such as, for example, a touchscreen or a tablet. It is to be further understood that as used herein the term user is not limited to a human being, and may comprise, a computer, a server, a website, a processor, a network interface, a human, a user terminal, a virtual computer, combinations thereof, and/or the like, for example.

In some embodiments, one or more external systems 22 may optionally communicate with the host systems 12. For example, the one or more external systems 22 may supply data transmissions regarding real-time or substantially real-time events (e.g., social media feeds, profile data, news alerts, weather alerts, etc.). In one example, the one or more external systems 22 may supply data transmissions from computer systems associated with services known as Facebook, Twitter, Instagram, and/or the like. Data transmission may be through any type of communication including, but not limited to, speech, visuals, signals, textual, and/or the like. For example, the one or more external systems 22 may supply data transmissions regarding politically based textual transmissions in social media such as Twitter, for example. Additionally, in some embodiments, one or more external systems 22 may supply data transmissions regarding one or more political events such as a debate, for example.

The one or more host systems 12 may interface and/or communicate with the user devices 14 and the external systems 22 via the network 16. For example, the host systems 12 may be configured to interface by exchanging signals (e.g., analog, digital, optical, and/or the like) via one or more ports (e.g., physical ports or virtual ports) using a network protocol, for example. Additionally, each host system 12 may be configured to interface and/or communicate with other host systems directly and/or via the network 16, such as by exchanging signals (e.g., analog, digital, optical, and/or the like) via one or more ports.

The network 16 may permit bi-directional communication of information and/or data between the host system 12, the user devices 14, and/or the external systems 22. The network 16 may interface with the host system 12, the user devices 14 and/or the external systems 22 in a variety of ways. For example, in some embodiments, the network 16 may interface by optical and/or electronic interfaces, and/or may use a plurality of network topographies and/or protocols including, but not limited to, Ethernet, TCP/IP, circuit switched path, combinations thereof, and/or the like. For example, in some embodiments, the network 16 may be implemented as the World Wide Web (or Internet), a local area network (LAN), a wide area network (WAN), a metropolitan network, a 4G network, a satellite network, a radio network, an optical network, a cable network, a public switch telephone network, an Ethernet network, combinations thereof, and the like, for example. Additionally, the network 16 may use a variety of network protocols to permit bi-directional interface and/or communication of data and/or information between the host system 12, the user devices 14 and/or the external systems 22.

Figure 2:
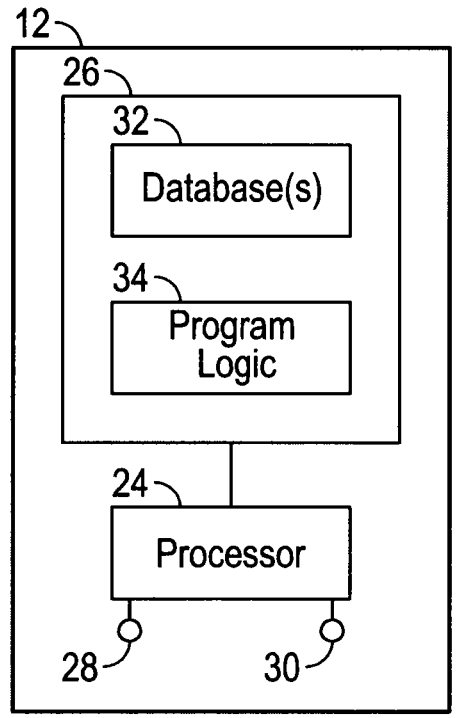
FIG. 2 is a diagrammatic view of an exemplary host system for use in the influential scoring system illustrated in FIG. 1.

Referring to FIGS. 1 and 2, in some embodiments, the host system 12 may comprise one or more processors 24 working together, or independently to, execute processor executable code and one or more memories 26 capable of storing processor executable code. Additionally, each host system 12 may include one or more input devices 28 and one or more output devices 30. Each element of the host system 12 may be partially or completely network-based or cloud-based, and may or may not be located in a single physical location.

The processor 24 may be implemented as a single processor or multiple processors working together, or independently, to execute the logic as described herein. It is to be understood, that in certain embodiments using more than one processor 24, the processors 24 may be located remotely from one another, located in the same location, or comprise a unitary multi-core processor. The processors 24 may be capable of reading and/or executing processor executable code and/or capable of creating, manipulating, retrieving, altering, and/or storing data structures into the one or more memories 26.

Exemplary embodiments of the processor 24 may include, but are not limited to, a digital signal processor (DSP), a central processing unit (CPU), a field programmable gate array (FPGA), a microprocessor, a multi-core processor, combinations, thereof, and/or the like, for example. The processor 24 may be capable of communicating with the one or more memories 26 via a path (e.g., data bus). The processor 24 may be capable of communicating with the input devices 28 and/or the output devices 30.

The processor 24 may be further configured to interface and/or communicate with the user devices 14 and/or the external systems 22 via the network 16. For example, the processor 24 may be configured to communicate via the network 16 by exchanging signals (e.g., analog, digital, optical, and/or the like) via one or more ports (e.g., physical or virtual ports) using a network protocol.

The one or more memories 26 may be configured to store processor executable code. Additionally, the one or more memories 26 may be implemented as a conventional non-transient memory, such as for example, random access memory (RAM), CD-ROM, a hard drive, a solid state drive, a flash drive, a memory card, a DVD-ROM, a disk, an optical drive, combinations thereof, and/or the like, for example.

In some embodiments, the one or more memories 26 may be located in the same physical location as the host system 12, and/or one or more memories 26 may be located remotely from the host system 12. For example, the one or more memories 26 may be located remotely from the host system 12 and communicate with the processor 24 via the network 16. Additionally, when more than one memory 26 is used, a first memory may be located in the same physical location as the processor 24, and additional memories 26 may be located in a remote physical location from the processor 24. Additionally, one or more memories 26 may be implemented as a "cloud" memory (i.e., one or more memories 26 may be partially or completely based on or accessed using the network 16).

The one or more input devices 28 may transmit data to the processor 24 and may be similar to the input devices 18. The input devices 28 may be located in the same physical location as the processor 24, or located remotely and/or partially or completely network-based. The one or more output devices 30 may transmit information from the processor 24 to a user, and may be similar to the output devices 20. The output devices 30 may be located with the processor 24, or located remotely and/or partially or completely network-based.

The one or more memories 26 may store processor executable code and/or information comprising one or more databases 32 and program logic 34. In some embodiments, the processor executable code may be stored as a data structure, such as a database and/or data table, for example.

Figure 3:
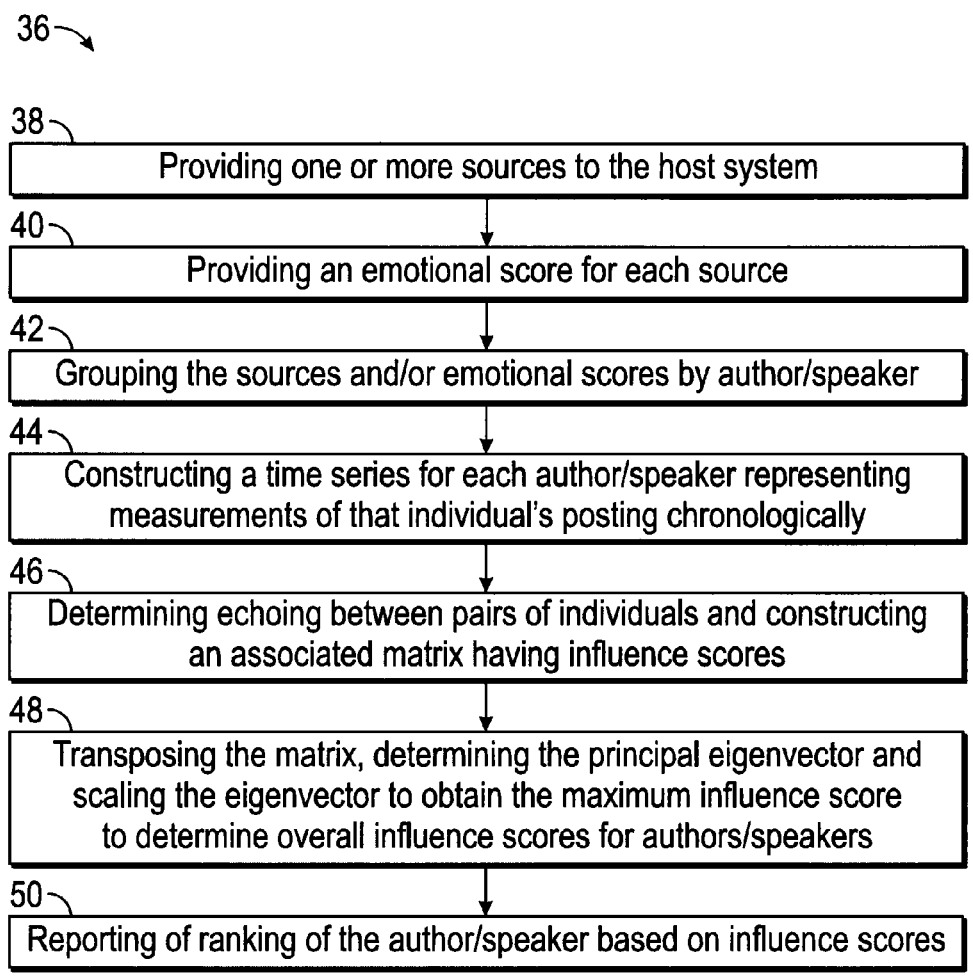
FIG. 3 is a flow chart of an exemplary method for determining influential scores for one or more authors.

Referring now to FIG. 3, generally crowd typing may be determined using a calculation resulting from an identification of an amount of influence being exerted by identified members (e.g., persons and/or entities) within a community. In some embodiments, crowd typing may be determined by graphing rank order of individual influence scores and measuring the slope of one or more fit lines and/or hierarchy of the crowd. An exemplary method for providing influence scores may be found in U.S. Ser. No. 14/311,334, which is hereby incorporated by reference in its entirety.

FIG. 3 illustrates a flow chart 36 of an exemplary method for determining influential scoring of persons and/or entities within a community. Generally, measurements of content of sources (e.g., documents, corpora, sub corpora, postings, feeds, and/or the like) may be used to determine measurements of influence in a community, ranking of individuals within the community, and identification of the most influential individuals within the community.

Influence may be a person(s) and/or entities' ability to affect and/or change thinking of others. The person(s) and/or entities may be considered influential if the content he or she generates is echoed by another individual. The term "echo" as used herein refers to third party content that bears a similarity to the original content and/or similarity in the emotional signal of the content, but which follows or is subsequent in time. In regards to highly influential persons, for example, echoes may be frequent and come from many other additional authors/speakers (i.e., third parties).

With each echo, there may be resemblance and reactivity. Transfer entropy techniques may be used to measure both resemblance of the echo and reactivity of the echo to determine the original speaker's influence over third parties. For example, in analyzing two time series A and B, transfer entropy may measure the amount of information on average revealed by examination time series B at any given moment, that may have been predicted by examination of the history of time series A preceding that moment, but that could not already have been predicted from the history of the time series B as detailed in EQ 1 and EQ. 2.

$$\forall k \in [K] \forall t \in [T]: S_{kt} \equiv_{def} \{j \in [C]: a_j = k \text{ and time}(D_j) = t\} \quad (EQ. 1)$$

wherein $$\forall k \in [K] \forall t \in [T]: x_{jt} = \frac{1}{|S_{kt}|} \sum_{j \in S_{kt}} \text{score}_j \text{ or } 0 \text{ if } S_{kt} = \emptyset \quad (EQ. 2)$$

wherein k is the number of an individual, t is time, $a_j$ is the author identification for the jth document of the source (e.g., corpus); $D_j$ is the jth document in the source; $x_{jt}$ is the average score of the author k's document in the time bin number t; j is the number of documents in the source; and $\text{score}_j$ is a quantitative semantic signal (e.g., emotional score) associated with document j.

Referring to FIG. 3, in a step 38, one or more sources may be provided to the host system 12. Sources may include, but are not limited to, documents, corpora, sub corpora, postings, Tweets, instant messages, sentences, fragments, and/or the like. Such sources may be visual, textual, and/or via sound. For example, one or more sources may be a radio broadcast provided to the host system 12. The host system 12 may translate the sound in the radio broadcast to text for analysis.

In a step 40, each source may be scored (e.g., emotional score) according to one or more measurement systems performing sentiment/emotion analysis, evaluation of semantic content, and computation of a quantifiable linguistic fingerprint (e.g., person word choice and/or sentence structure habits).

In some embodiments, one or more databases 32 may include one or more tables stored in the one or more memories 26 that may be used for conducting an initial emotional scoring analysis on textual strings obtained from the external systems 22, the user devices 14, and/or the like. Each table may include a collection of words. Each word may be paired with a plurality of emotions (i.e., word-emotion pairing). Each word-emotion pairing may be provided an emotional score. For example, for the word "dangerous" the word-emotion pairing may be dangerous/anger. An emotional score may be provided for the word-emotion pairing. Emotional scores for each word may be provided for a plurality of emotions. The table may be created prior to evaluation of influential scores, and in such case, the table may be indicated herein as being "predefined". It should be noted, however, that computerized methodologies may be used to create and/or update the table (with or without human intervention). The computerized methodologies may include adaptive algorithms, fuzzy logic algorithms, expert system algorithms, and/or the like.

An output emotional score for the source as a whole may be determined. The output emotional score may be denoted $f(D_j)$ in the following equation:

$$\forall j \in [C]: \text{score}_j =_{def} f(D_j) \quad (EQ. 3)$$

In a step 42, the source and/or emotional scores may be grouped by author/speaker. For example, authors/speakers may be identified by numbers within the set [K] with:

$$[K] = \{1, 2, \ldots, K\} \quad (EQ. 4)$$

The time stamp of the source may be placed within a bin and identified by a number in the set [T] wherein:

$$[T] = \{1, 2, \ldots, T\} \quad (EQ. 5)$$

In a step 44, for each author/speaker, a time series may be constructed that represents the measurements of a member's posting chronologically. In some embodiments, an average or sum score for each time-bin may be used as a corresponding data point in the time series.

In a step 46, echoing between pairs of members may be determined. For example, for each ordered pair of members X and Y, a measurement may be made of the extent to which X's associated time series is echoed in Y's time series. Generally, an estimate of the transfer entropy between the two series by one or more statistical techniques may be used (e.g., plug-in estimation, kernel density estimation, adaptive partitioning, symbolic conversion, bias correction, and/or the like). A matrix M may be constructed containing these estimated pairwise influence scores wherein:

$$M_{kl} = \sum_{t=R+1}^{T} p(x_{lt}^{(R+1)}, x_{kt}^{(R)}) \log_2 \frac{p(x_{lt} | x_{lt}^{(R)}, x_{kt}^{(R)})}{p(x_{lt} | x_{lt}^{(R)})} \quad (EQ. 6)$$

wherein:

$$M \in R^{K \times K} \quad (EQ. 7)$$

wherein each state represents the average score of posts made by author 1 at time t. Further, $x_{kt}^{(R)}$ is the vector consisting of last R states of the variable $x_{kt}$, with each state representing the average score of posts made by author k at time t.

In a step 48, the matrix may be transposed and the principal eigenvector of M may be determined. The eigenvector may be scaled (to v') such that desired maximum influence score (e.g., 1 or 100) may be determined. The coordinates of the scaled eigenvector may be reported such that $j^{th}$ entry is the $j^{th}$ overall influence score for the author/speaker.

In some embodiments, additional processing may optionally be performed on the influence scores. For example, in some embodiments, the influence scores may be sorted by size. In another example, influence scores may be combined with other measures of influence to improve robustness and/or accuracy of the results. For example, if influence scores of two authors/speakers are deemed close (e.g., within an experimentally determined threshold), a second ranking mechanism may be used to further define the influence scores. In one example, influence scores may be ordered according to an average number of responses to each source as a secondary ranking mechanism.

In a step 50, ranking of the author/speaker may be reported using the influence scores. For example, a list may be provided with the determination of key influencers, measuring influence of a particular individual of interest, estimating marketing return on investment arising from targeted PR, and/or the like.

Figure 4:
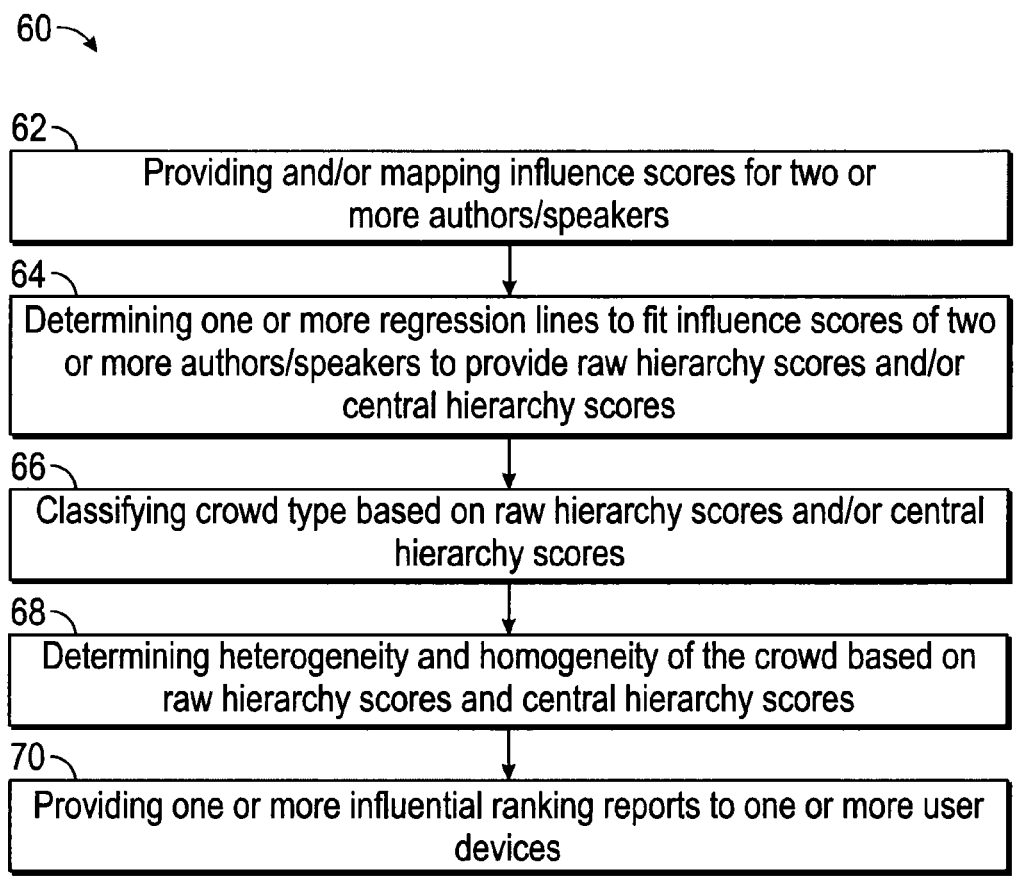
FIG. 4 is a flow chart of an exemplary method for determining crowd type using influential scores for two or more authors in accordance with the present disclosure.

Referring to FIG. 4, using influence scores, underlying communities may be modeled and graphed to determine and provide interpretations of crowd types. FIG. 4 illustrates a flow chart 60 of an exemplary method for determining crowd types based on influence scores. Generally, using a log-linear plot, the sequence of influence scores may be graphed and interpreted providing a measurement of the degree of influence hierarchy in a community. Using the degree of influence hierarchy within a community, associative crowd types may be determined and communities classified and/or further evaluated as described in detail herein.

Figure 5A:
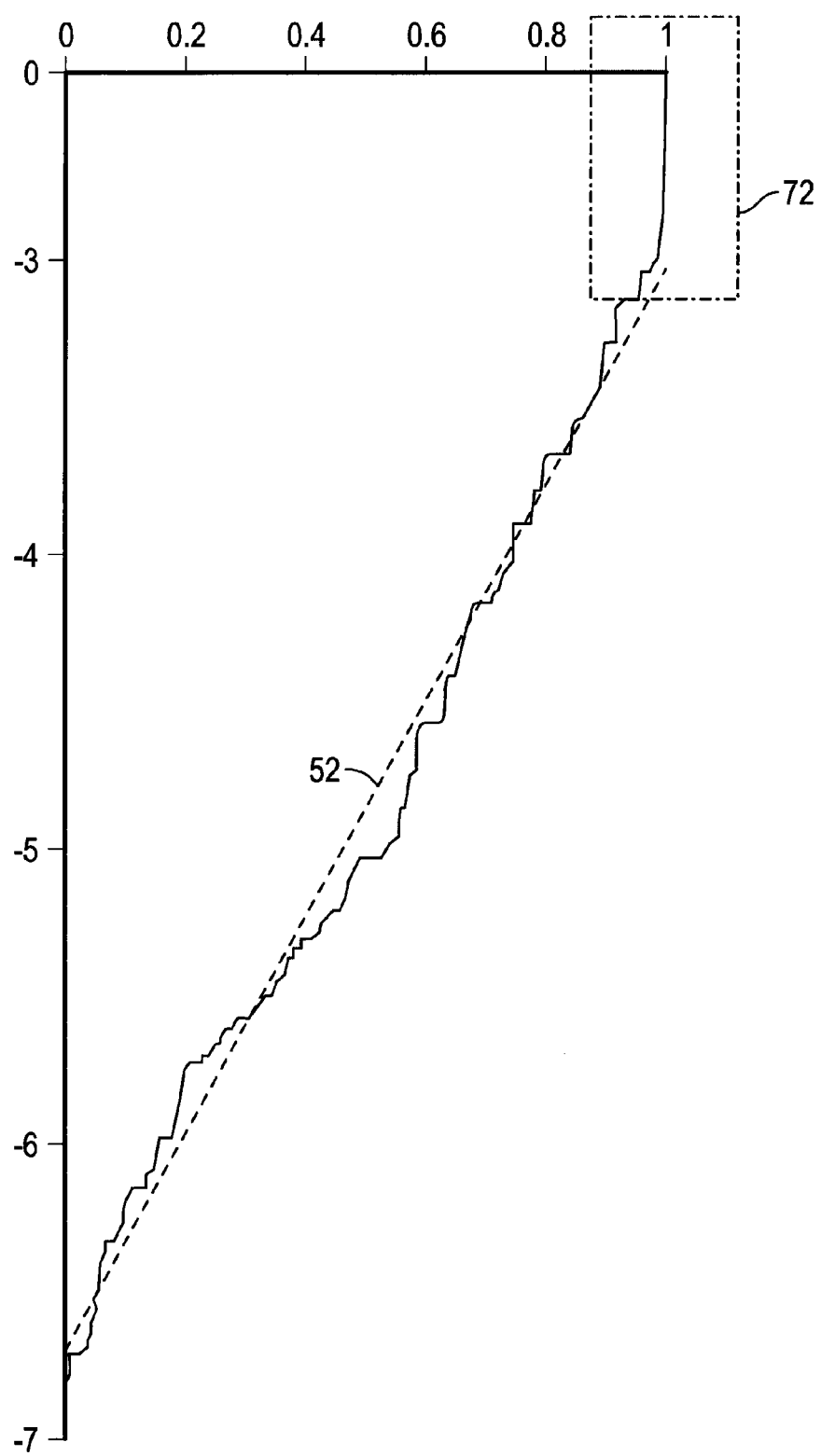
FIGS. 5A and 5B are exemplary graphical mappings of influential scores and illustrate raw hierarchy score and central hierarchy score of a crowd wherein the horizontal axis illustrates positions of authors in order of influence and the vertical axis is a logarithm of normalized influence scores.
Figure 5B:
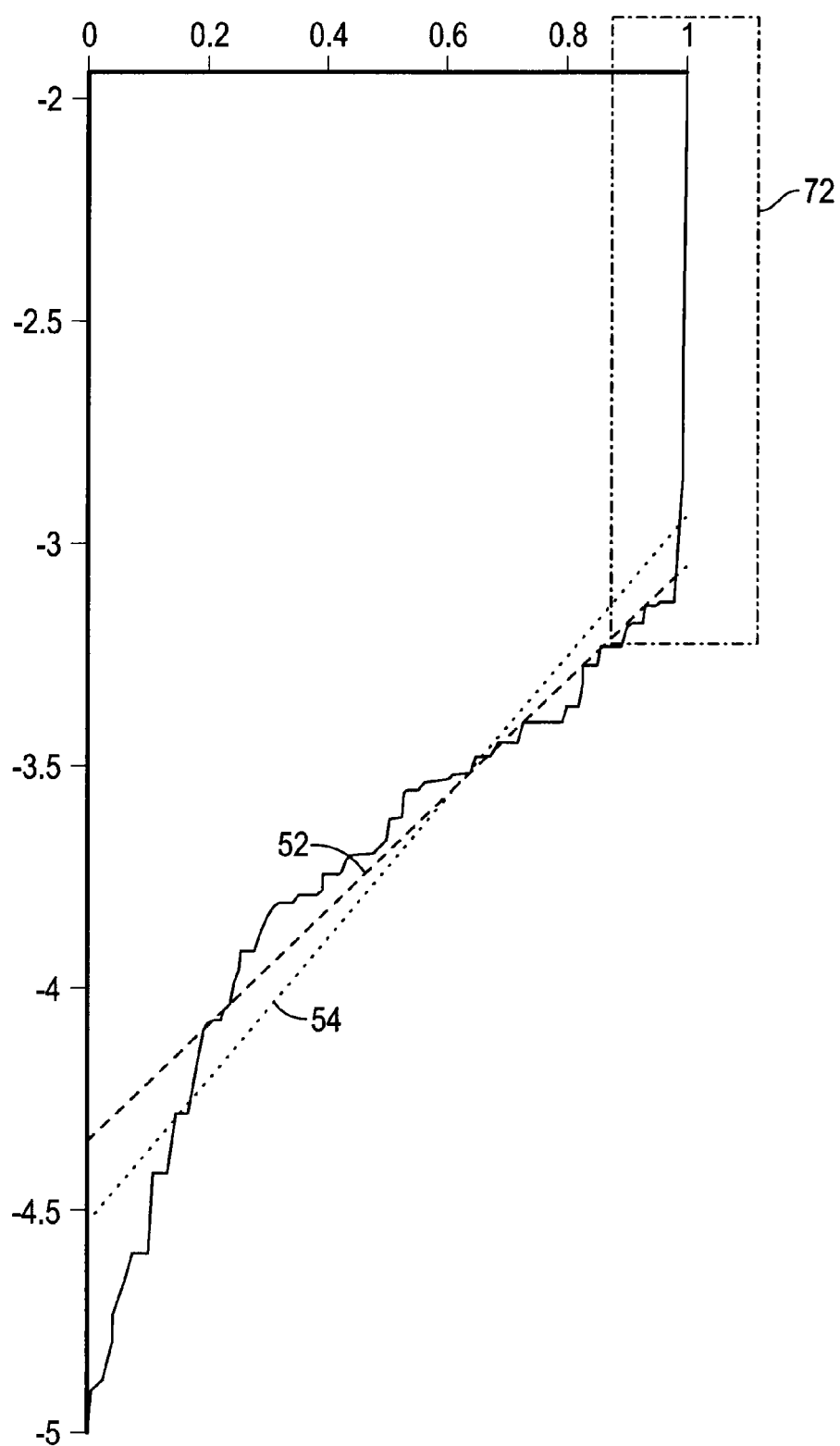

In a step 62, influence scores may be provided for two or more authors/speakers. For example, using the exemplary method set out in FIG. 3, influence scores may be provided wherein the scores may be referred to as $x_1, x_2, \ldots, x_n$, wherein n is the number of individuals having a determined influence score. Such scores may be sorted such that $x_1 \le x_2 \le \ldots \le x_n$. Referring to FIGS. 5A and 5B, influence scores may be mapped wherein a horizontal axis may be position of the influence scores in rank order and a vertical axis is logarithm of scaled influence scores.

In a step 64, one or more regression lines may be determined to fit the influence scores as illustrated in FIGS. 5A and 5B. The one or more regression lines may be determined using methods including, but not limited to, least squares approach, minimizing a lack of fit (e.g., least absolute deviations regression), ridge regression, and/or the like. For example, using a least squares approach, a first regression line 52 may be fit to the set of points to provide the raw hierarchy score:

$$\{(i/n, \log(x_i)): i=1, \ldots, n\} \quad \text{(EQ. 8)}$$

In this example, the raw hierarchy score is the slope of the first regression line 52.

In this example, a second regression line 54 may then be fit (e.g., via the Theil-Sen method) to the same set of points (i.e., the slope of each pair $(i/n, \log(x_i))$ and $(j/n, \log(x_j))$, wherein:

$$n \times \frac{\log x_j - \log x_i}{j - i} \quad \text{(EQ. 9)}$$

The median of all such slopes may be determined, resulting in a "central hierarchy score" M.

Figure 6:
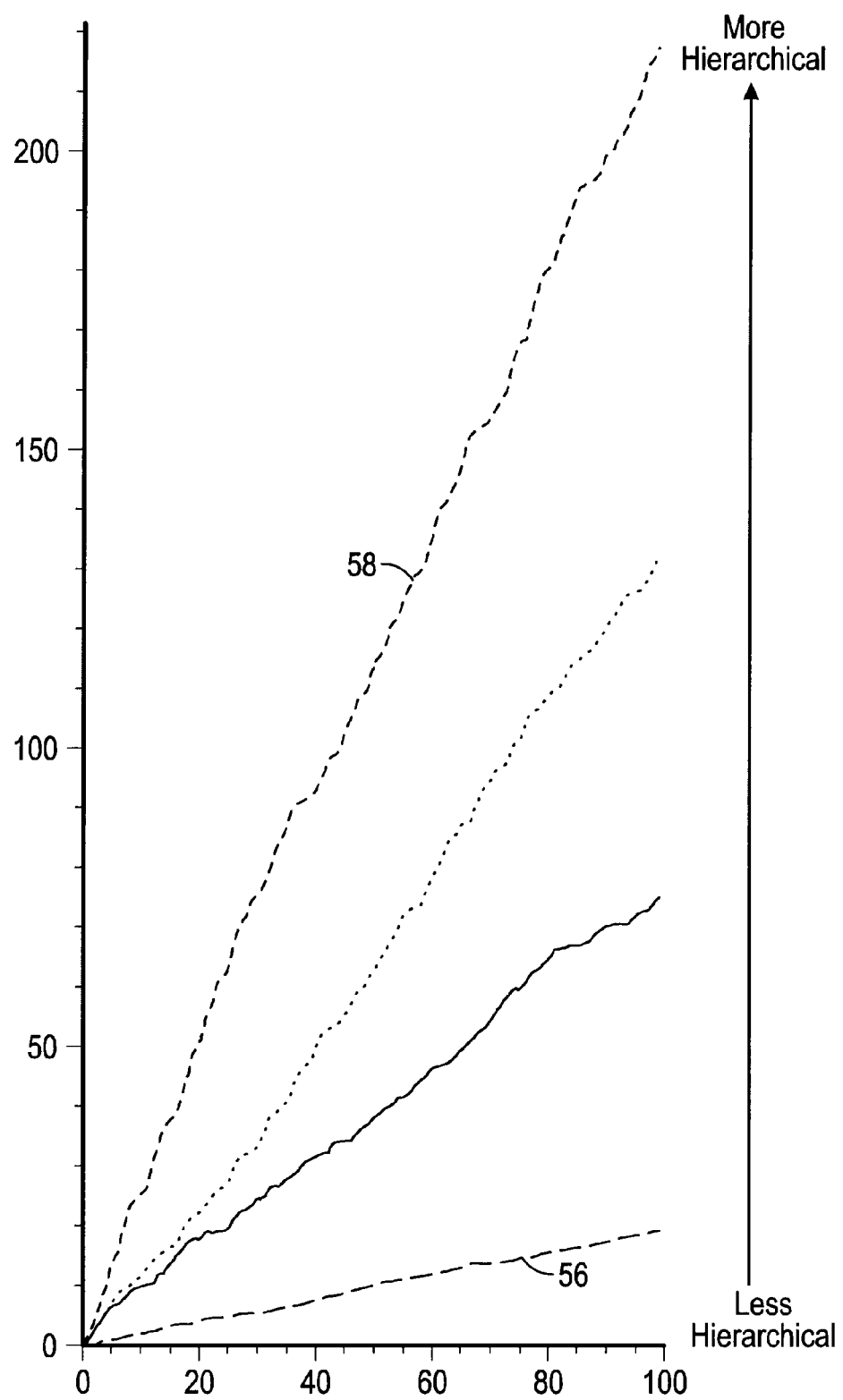
FIG. 6 is an exemplary graphical mapping of influential scores and illustrates varying hierarchy of a crowd wherein the horizontal axis illustrates positions of authors in order of influence and the vertical axis is a logarithm of normalized influence scores.

In a step 66, the raw hierarchy score and/or the central hierarchy score may be classified using context-appropriate labels. In particular, one or more database 32 may include crowd type labels assigned to one or more ranges of hierarchy scores (i.e., raw hierarchy scores and/or central hierarchy scores). For example, as illustrated in FIG. 6, a low value for the central hierarchy score as shown by reference numeral 56 may be labeled as an egalitarian type crowd. A high value for the central hierarchy score as shown by reference numeral 58 may be labeled as a highly stratified type crowd. In some embodiments, crowd types may be provided classifications based on ranges. For example, illustrated in FIG. 7 are four general crowd types school of fish, democracy, central committee, and mafia. Although FIG. 6 illustrates four different crowd types, any number of crowd types may be used (e.g., two crowd types, thirty crowd types). Additionally, ranges for each crowd type may be distinct, or in some embodiments, one or more ranges for each crowd type may overlap. For example, a crowd may be classified as a school of fish and democracy if ranges for each crowd type overlaps. In some embodiments, ranges amounts for each crowd type may be substantially similar. Alternatively, one or more crowd types may have a lesser or greater range than other crowd types.

In some embodiments, the determination of hierarchy of the crowd may provide insight for marketing strategies. For example, the crowd type of a first political candidate may be determined and compared against the crowd type of a second political candidate. In one example, the first political candidate may have a more hierarchical crowd type as compared to the second political candidate. The second political candidate, however, may be leading in polls. The first political candidate may alter marketing strategies to a more grassroots organizing and/or focus more on talking points that reach more (but possibly less-connected) voters. Alternatively, if the crowd type appears resistant to change, the first political candidate may reduce direct contact with individuals and invest heavily in connecting with the most influential individuals.

In a step 68, heterogeneity and homogeneity of the crowd may be determined. For example, referring to FIGS. 5A and 5B, if there is a significant difference between the raw hierarchy score and the central hierarchy score, the crowd type may be determined to be heterogeneous. Generally, a heterogeneous crowd includes a mixture of two or more crowd types. For example, if the raw hierarchy score is classified within one crowd type (e.g., school of fish), and the central hierarchy score is classified in another crowd type (e.g., mafia), a significant difference may be deemed between the two scores, and the crowd type may be determined to be heterogeneous. It should be noted that in some embodiments a heterogeneous crowd may exist in a single crowd type (e.g., school of fish), wherein the scores span the range of the crowd type, for example. Conversely, if there is only a small difference or no difference between the raw hierarchy score and central hierarchy score, the crowd type may be determined to be homogenous. Generally, a homogenous crowd exists in a single crowd type (e.g., school of fish). For example, both the raw hierarchy score and the central hierarchy score may fall into the same crowd type (e.g., school of fish). In another example, the difference between the slopes may be at most the length of the smaller slope range (i.e., interval) that the slopes fall into.

Additional information may be determined using the raw hierarchy score and the central hierarchy score and/or the relations between the scores. For example, reference numeral 72 illustrates an upward turn at the high end of influence scores. This upward turn 72 may indicate a controlling cabal within the community who holds a majority of influence within the crowd. In another example, high heterogeneity may also be interpreted as indicative of noisy data as input to the influence computation as high-quality data may yield nearly log-linear influence scores.

In a step 70, one or more influential score reports may be provided to the one or more user devices 14. An exemplary influential score report 74 is illustrated in FIG. 7.

The influential score report 74 may include, but is not limited to, a listing of influential scores ranked according to author/speaker 76, an associative crowd type 78 for the listing or partial listing of influential scores, a determination of heterogeneity/homogeneity of the crowd, one or more marketing strategies 80 based on influential scores/crowd type/heterogeneity/homogeneity of the crowd, and/or the like.

In one example, the influential score report 74 may provide a marketing plan or strategy 80, including at least one recommendation, for a company for one or more products. For example, a company may be looking to promote a Product A. Over a time period, the company has provided one or more advertisements, product placements, and/or one or more product details via media (e.g., social media, television, radio). The company may have provided one or more Tweets including the product name via social media, for example. Using the methods set out in FIGS. 3 and 4, influential scores may be determined for authors/speakers that include the product name within one or more sources. These influential scores may also include the company, as the company provided one or more Tweets, for example. In some embodiments, the influential scores may be provided in the influential score report 74.

In some embodiments, the authors/speakers that include the product name within one or more sources may be ranked as illustrated by numeral 76 in FIG. 7. Ranking of the authors/speakers may indicate the most influential authors/speakers with regard to the Product A. Such ranking may include both negative and positive influence. Additionally, ranking of the authors/speakers may also provide an indication of the company's own marketing efforts. For example, the company may be considered an author/speaker for the one or more Tweets, and as such, ranked by influential scores. If the marketing efforts are poor, the company may be ranked low and marketing efforts may be retooled to those serving the company in a more productive capacity. The ranking of the top authors/speakers and/or company may be provided in the influential score report 74. Additionally, in some embodiments, a listing of top influencers 82 and/or bottom influencers may be provided within the report 74. The listing may include any number influences. For example, in FIG. 7, the top three influences are included in the listing 82; however, more or less influencers may be included within the listing depending on use of the report 74, client determinations, and/or the like.

The influential scores may be graphed and raw hierarchy scores and central hierarchy scores may be determined to classify the crowd type in relation to the authors/speakers having one or more sources discussing Product A as illustrated by numeral 84 in FIG. 7. The slope of the line may provide the classification of the crowd type as described in further detail herein. Using the crowd type, a marketing plan may be determined for Product A and included in the influential score report 74. For example, if the classification of the crowd type is "central committee" (i.e., a small group of individuals have a large influence over the crowd), then a targeted approached towards the small group of individuals with large influence may be suggested as a marketing plan on the influential score report 74. If the classification of the crowd type is "democracy", then a grass roots marketing campaign may be suggested as a marketing plan on the influential score report 74.

In some embodiments, crowd types may be analyzed over a period of time. For example, one or more marketing strategies may be designed to alter crowd types including, but not limited to, campaigns, advertising efforts, refocusing of PR investment, and/or the like). The effectiveness of such marketing strategies may be analyzed over a pre-defined period of time. For example, if Company X is concerned that too much conversation about a Product Y is driven by random internet chatter and Company X would like more control over the discussion, Company X may analyze the current crowd type (i.e., score), run one or more campaigns, and test to see if the crowd type has changed (e.g., favorably) due to marketing efforts.

In some embodiments, crowd type may be measured and/or analyzed to maximize return of investment (ROI) on PR budget. For example, a Country A may be interested in influencing an outcome of an election in a Country B. By analyzing and determining hierarchy score and crowd types associated with conversations on social media (e.g., Twitter) about political candidates in Country B, the Country A may determine which strategy to use to influence the outcome. For example, if the hierarchy score/crowd type falls into a low range, broad-scale efforts may be more effective (e.g., mass promotions/advertising). If the hierarchy score/crowd type falls into a higher range, targeted persuasion may be more effective (e.g., influence marketing).

In some embodiments, determination of heterogeneousness of a crowd may aid in further determining the marketing strategy for one or more products. For example, Company X may determine that a crowd is more heterogeneous using the methods described herein. As the crowd is heterogeneous, the Company X may need a multifaceted marketing approach covering multiple crowd types (e.g., sending promotional merchandise to a few key influencers while also providing mass promotion). If the crowd is more homogeneous, the Company X may focus the marketing strategy on a single form of advertisement designed to give the best ROI for a particular crowd.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A computerized method implemented by at least one processor executing computer executable code having instructions that when executed by the at least one processor cause the at least one processor to perform steps comprising:
   analyzing a plurality of time series data strings provided by two or more authors, each time series data string having at least one pre-determined word to generate a first data set including a plurality of emotional scores with respect to the pre-determined word within the data strings;
   determining influence scores for each author based on the emotional scores and echoing of the time series data strings, the authors forming a crowd;
   determining a first regression line based on the influence scores to provide a raw hierarchy score using slope of the first regression line;
   determining a second regression line to provide a central hierarchy score using slope of the second regression line;
   comparing the raw hierarchy score and the central hierarchy score to classify crowd type of the two or more authors; and,
   outputting an influential score report indicating the crowd type based on comparison of the raw hierarchy score and the central hierarchy score.

2. The method of claim 1, wherein the raw hierarchy score is provided using a method of least squares.

3. The method of claim 1, wherein the central hierarchy score is provided using a Theil-Sen method.

4. The method of claim 1, wherein the time series data strings are provided to the processor via an external source.

5. The method of claim 4, wherein the external source is a social media server.

6. The method of claim 1, wherein a transfer entropy technique is used to determine echoing of the data strings.

7. The method of claim 1, wherein the influential score report includes a ranking of the authors by influential scores.

8. The method of claim 1, further comprising mapping of the influential scores on a log-linear plot.

9. The method of claim 1, further comprising the step of determining at least one of heterogeneity and homogeneity of the crowd.

10. The method of claim 1, wherein the influential score report includes predefined parameters for a marketing plan based on the crowd type.

11. The method of claim 1, wherein each time series data string includes at least one pre-determined word, and wherein the method further comprises generating data sets including a plurality of emotional scores with respect to the at least one pre-determined word within the time series data strings, and the plurality of emotional scores are used to determine types of emotions each author is exhibiting in each time series data string.

12. A system, comprising:
a host system having a microprocessor; and,
a computer readable medium storing a set of instructions that when executed by the microprocessor, cause the microprocessor to:
obtain and record in a first database, scores indicative of emotional scoring;
obtain at least two textual sources of information having time information indicative of the times when the textual sources of information were created;
analyze and determine an emotional score for the textual sources of information using the first database;
analyze and determine an influential score for authors of the textual sources of information, the authors forming a crowd;
map the influential scores for authors of the textual sources of information;
analyze and determine crowd type of the authors of the textual source of information using the map of the influential scores; and,
generate and pass digital data indicative of an influential score report containing the crowd type to at least one user device in communication with the host system.

13. The system of claim 12, wherein the map is a log-linear mapping of the influential scores.

14. The system of claim 13, wherein determining crowd type of the authors of the textual source of information using the map of the influential scores includes fitting at least one regression line to the influential scores in the map.

15. The system of claim 14, wherein the set of instructions that when executed by the microprocessor, cause the microprocessor to determine a first slope of a first regression line and to interpret the first slope to provide a raw hierarchy score for the crowd type.

16. The system of claim 15, wherein the set of instructions that when executed by the microprocessor, cause the microprocessor to determine a second slope of a second regression line and interpret the second slope to provide a central hierarchy score for the crowd type.

17. The system of claim 16, wherein the raw hierarchy score and the central hierarchy score are compared to determine heterogeneity and homogeneity of crowd.

* * * * *